United States Patent [19]

Takeda et al.

[11] Patent Number: 4,667,926
[45] Date of Patent: May 26, 1987

[54] BALL VALVE

[75] Inventors: Shinji Takeda; Teruyoshi Asano; Yoshiaki Bando, all of Saitama, Japan

[73] Assignee: Sekisui Kagaku Kogyo Kabushiki Kaisha, Osaka, Japan

[21] Appl. No.: 845,498

[22] Filed: Mar. 31, 1986

Related U.S. Application Data

[63] Continuation of Ser. No. 660,672, Oct. 15, 1984, abandoned.

[30] Foreign Application Priority Data

Oct. 20, 1983 [JP] Japan .................................. 58-197300

[51] Int. Cl.⁴ .............................................. F16K 25/00
[52] U.S. Cl. ...................................... 251/170; 251/315
[58] Field of Search ................ 251/148, 170, 192, 315

[56] References Cited

U.S. PATENT DOCUMENTS

| | | | |
|---|---|---|---|
| 3,067,978 | 12/1962 | Natho | 251/315 |
| 3,211,421 | 10/1965 | Johnson, Jr. et al. | 251/315 |
| 3,223,111 | 12/1965 | Anderson | 251/315 |
| 3,550,902 | 12/1970 | Pidgeon et al. | 251/315 |
| 3,647,179 | 3/1972 | Scaramucci et al. | 251/172 |
| 3,807,692 | 4/1974 | Usab et al. | 251/315 |
| 3,826,281 | 7/1974 | Clark | 251/315 |
| 3,961,770 | 6/1976 | Wrasman | 251/315 |
| 4,059,250 | 11/1977 | Guldener et al. | 251/315 |
| 4,103,865 | 8/1978 | Nanba et al. | 251/315 |
| 4,327,895 | 5/1982 | Blumenkranz et al. | 251/315 |
| 4,449,694 | 5/1984 | Hobart et al. | 251/315 |

OTHER PUBLICATIONS

Japanese Utility Model Application No. 57-105474/1982.

Primary Examiner—Martin P. Schwadron
Assistant Examiner—Sheri M. Novack
Attorney, Agent, or Firm—Sughrue, Mion, Zinn, Macpeak and Seas

[57] ABSTRACT

A ball valve in which, even when a connecting sleeve is removed by loosening the associated union nut, the ball and annular seals of the valve will not blow out of the valve body under fluid pressure. A ball with an integral spindle is arranged in the valve body in such a manner as to be able to open and close a fluid passage therein. A seat is formed in the valve body and a part of the surface of the ball on the side thereof opposite the side where the spindle is provided and around a rotational axis of the spindle is in surface contact with the seat to thereby pivotally support the ball. Annular seals are provided in the fluid passage abutting against the ball from both sides to pivotally support the ball with the annular seals being urged towards the ball by seal carriers.

5 Claims, 7 Drawing Figures

BALL VALVE

This is a continuation of application Ser. No. 660,672 filed Oct. 15, 1984 now abandoned.

BACKGROUND OF THE INVENTION

The present invention relates to ball valves, and more particularly to a block-type ball valve which is designed to firmly retain the ball of the valve within the valve body.

As an example of conventional ball valves, a so-called "union-type ball valve" is known in which a ball is arranged in a cylindrical valve body in such a manner that it can open and close a fluid passage therein. Annular seals abut against the ball from both sides in the fluid passage, the annular seals being urged towards the ball by seal carriers. In the ball valve, when connecting sleeves are connected to the valve body, the connecting sleeves push the seal carriers towards the ball. The seal carriers are pushed by the connecting sleeves which are connected to the valve body, for instance, with union nuts, so that the abutment pressures of the annular seals to the ball can be adjusted by tightening or loosening the union nuts. Therefore, when the annular seals wear to the extent of causing leakage of fluid, the leakage can be eliminated by further tightening the union nuts.

The most serious drawback of a ball valve of this type is that, under the condition that the ball closes the fluid passage and the fluid pressured is applied, the union nut and the connecting sleeve on the other side cannot be removed. In order to repair or replace the pipe line connected to the connecting sleeve, it is necessary to loosen the union nut thereby to remove the connecting sleeve. However, if the connecting sleeve is removed, the ball and the seal carrier may blow out of the valve body due to the fluid pressure. Thus, the removal of the connecting sleeve under this condition is dangerous.

In order to eliminate this drawback, a ball valve, as disclosed by U.S. Pat. No. 3,550,902, for instance, has been proposed in which one seal carrier is provided on only one side of the ball while the other seal carrier is made integral with the valve body. With this valve, piping is performed with the seal carrier faced towards the side to which the pressure is applied. However, the ball valve is still disadvantageous due to the fact that the adjustment to compensate for wear of the annular seals is carried out by further tightening only one of the union nuts. If tightening is repeatedly carried out in this manner, the center of the ball will be significantly displaced from the center axis of the spindle. As a result, the torque required for turning the handle to turn the ball thereby to open and close the valve is increased; that is, the valve cannot be smoothly opened and closed. If the handle is forcibly turned, the spindle is pushed from one side only, as a result of which leakage occurs at the seals around the spindle.

U.S. Pat. Nos. 4,327,895 and 4,449,694 and Japanese Utility Model Application No. 105474/1982 disclose ball valves in which a seal carrier is screwed into the valve body in order to prevent the seal carrier from blowing out of the valve body. U.S. Pat. No. 4,059,250 discloses a valve ball in which a seal carrier having dogs along the periphery thereof is turned after being pushed into the valve body so that the dogs are engaged with lips formed in the bore at each end of the valve body in order to prevent the seal carrier from blowing out of the valve body. However, employment of the above-described methods of screwing the seal carrier into the valve body or turning the seal carrier after pushing into the valve body it is necessary to use a special tool. Furthermore, the ball valve becomes intricate in construction, and accordingly the valve assembly and disassembly operations are time consuming.

U.S. Pat. No. 3,807,692 discloses a ball valve which is formed by injection molding a valve body with synthetic resin, with pre-fabricated ball integrally with a spindle and annular seals in the mold cavity. In accordance with this method, because the ball is surrounded by the valve body, even when the connecting sleeve is removed by loosening the union nut, the ball cannot blow out of the valve body. However, the ball valve is still disadvantageous in that, since the annular seals together with the ball are insertedly molded in the valve body, further adjustment of the abutment pressures of the annular seals to the ball cannot be done, and if the annular seals are worn to the extent of causing leakage, uneconomically, the valve must be replaced in its entirety.

SUMMARY OF THE INVENTION

Accordingly, an object of the invention is to eliminate the above-described difficulties accompanying a conventional ball valve.

In accordance with the above and other objects, the invention provides a ball valve which is provided with a mechanism for further tightening annular seals in a union-type ball valve, and a mechanism for preventing the ball from blowing out in the ball valve which is integrally molded with a ball, so that, even if the connecting sleeve is removed by loosening the union nut, the ball and the annular seals cannot blow out of the valve body, and the abutment pressures of the annular seals to the ball can be adjusted by further tightening the union nut to prevent the leakage of fluid.

DESCRIPTION OF THE PREFERRED EMBODIMENTS

A ball valve constructed according to the invention will now be described with reference to the accompanying drawings.

Figure 1:
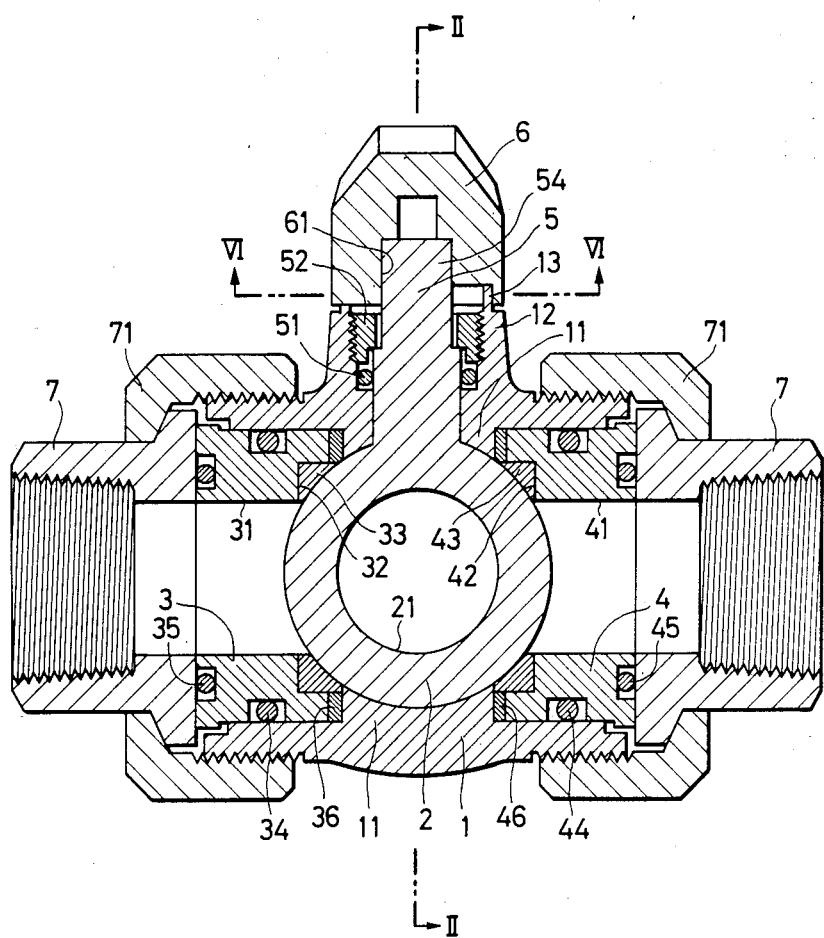
FIG. 1 is a vertical sectional view showing an example of a ball valve according to the invention.
Figure 2:
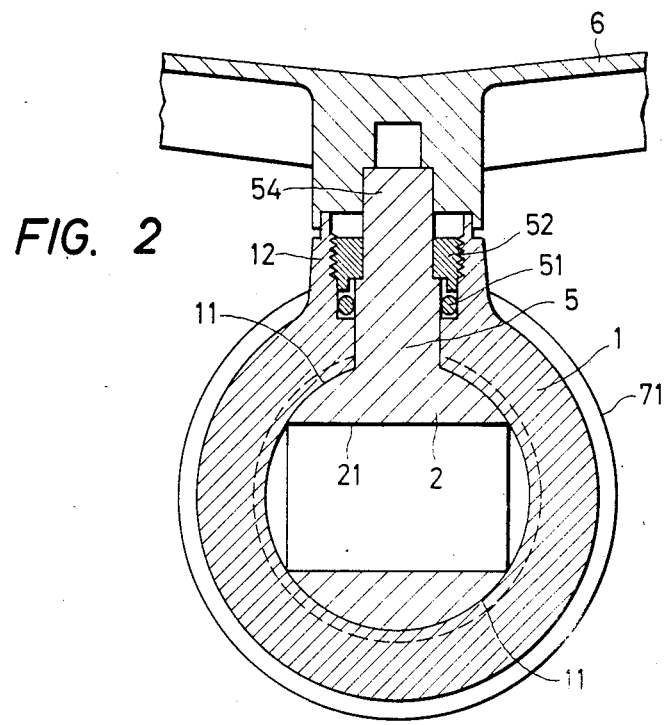
FIG. 2 is a cross-sectional view taken along a line II—II in FIG. 1.

FIG. 1 is a vertical sectional view showing an example of the ball valve of the invention, and FIG. 2 is a cross-sectional view taken along a line II—II in FIG. 1. In these figures, reference numeral 1 designates a valve body; 2, a ball; and 3 and 4, seal carriers. Through-bores 21, 31 and 41 of substantially equal inside diameters are formed in the ball 2 and the seal carriers 3 and 4, respectively. These through-bores form a passage for fluid.

The ball 2 formed integrally with a spindle 5 is inserted in the valve body 1 with the spindle 5 protruding outside the valve body 1. The ball 2 is pivotally held with its external surface including the spindle 5 in contact with an annular seat 11 formed in the inner wall of the valve body 1. By turning a handle 6 secured to the spindle 5, the ball 2 on the seat 11 can be turned to open or close the fluid passage. Since the ball 2 is held with its external surface in contact with the annular seat 11, the ball 2 will not come off the seat 11 even when the fluid pressure in the fluid passage acts on the ball 2.

The seat 11 is formed by, in molding the valve body, by injection molding machine, holding the ball in place in the mold cavity, and applying molten resin directly to the surface of the ball thus held. The configuration of the seat 11 may be changed by using a mold with appropriate configuration. However, a ball valve in which, as shown in the figures, the ball 2 is pivotally supported by the entire inner surface of the valve body 1 has an advantage that the gap (dead space) between the ball 2 and the inner wall of the valve body 1 is small, and therefore the amount of so-called "dead water" is reduced as much.

An O-ring 51 is inserted between the spindle 5 of the ball and the bearing part 12 of the valve body 1. The O-ring 51, retained by a bushing 52, serves as a seal around the spindle.

Annular recesses 32 and 42 are formed on the sides of the seal carriers 3 and 4 adjacent to the ball 2, respectively. Annular seals 33 and 43 are fitted in the recesses 32 and 42, respectively. By pushing the seal carriers 3 and 4 towards the ball 2, annular seals 33 and 43 are pushed against the ball 2 to maintain the fluid passage sealed.

In order to push the seal carriers 3 and 4 towards the ball 2, the structure of the ball valve is of a conventional union type such that connecting sleeves 7 adapted to connect pipes are set on the outer end faces of the seal carriers 3 and 4, and are then secured by screwing union nuts 71 onto threads formed on the exterior surface of two cylindrical end portions of the valve body 1.

Under the condition that the seal carriers 3 and 4 are pushed towards the ball 2, gaps are present between the two end faces of the valve body 1 and the connecting sleeves. Therefore, the abutment pressures of the annular seals 33 and 43 against the ball 2 can be adjusted by further tightening the union nuts 71.

In these figures, reference numerals 34 and 44 designated O-rings provided between the valve body 1 and the seal carriers 3 and 4, respectively; and 35 and 45, O-rings provided between the seal carriers 3 and 4 and the connecting sleeves 7, respectively.

Further in the figure, reference numerals 36 and 46 designate elastic packings provided between the seal carriers 3 and 4 and the seats 11, respectively. The packings 36 and 46 are preferably set compressed because, if the annular seals 33 and 43 are worn so as to contact the outer surface of the ball nonuniformly, or when the ball 2 is turned to open or close the valve, the packings elastically push the seal carriers 3 and 4 towards the connecting sleeves 7, and therefore maintained are uniform sealing of the O-rings provided between the seal carriers 3 and 4 and the connecting sleeves 7, and between the ball 2 and annular seals 33 and 43.

The above-described ball valve is installed in piping as follows: Pipes are connected to the connecting sleeves 7 and the valve body 1 is set between the connecting sleeves 7. Under this condition, the union nuts 71 are engaged with the threaded parts of the two end portions of the valve body 1. When it is necessary to replace the ball seat or the pipe, the ball 2 is turned to close the valve, and then the union nut 71 is removed. Under this condition, the pipe is disconnected to replace the ball seat or the pipe. As the ball 2 is held in contact with the substantially spherical concave seat 11, the ball 2 cannot blow out even when liquid pressure is applied to the ball from one side thereof. Even if leakage occurs, it can be eliminated by further tightening the union nuts 71.

Figure 3:
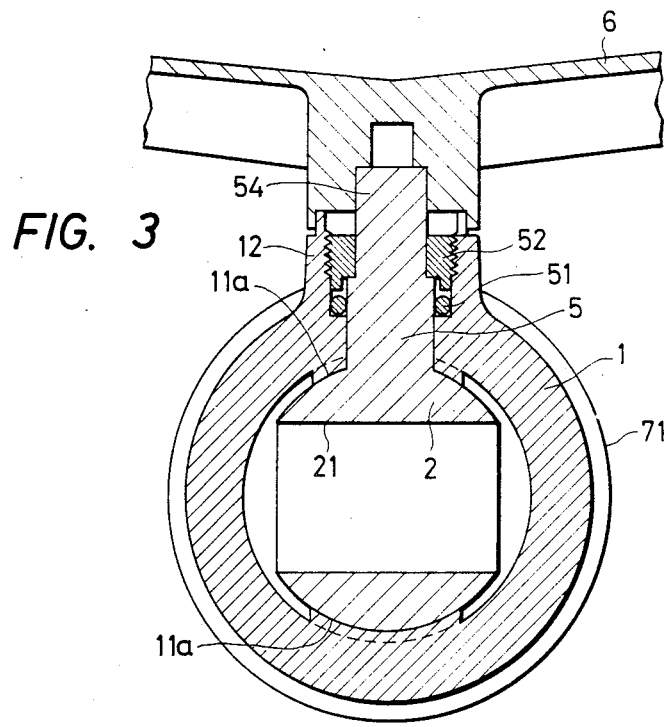
FIGS. 3, 4 and 5 are cross-sectional views similar to that of FIG. 2, showing modifications of the ball and valve body shown in FIGS. 1 and 2.
Figure 4:
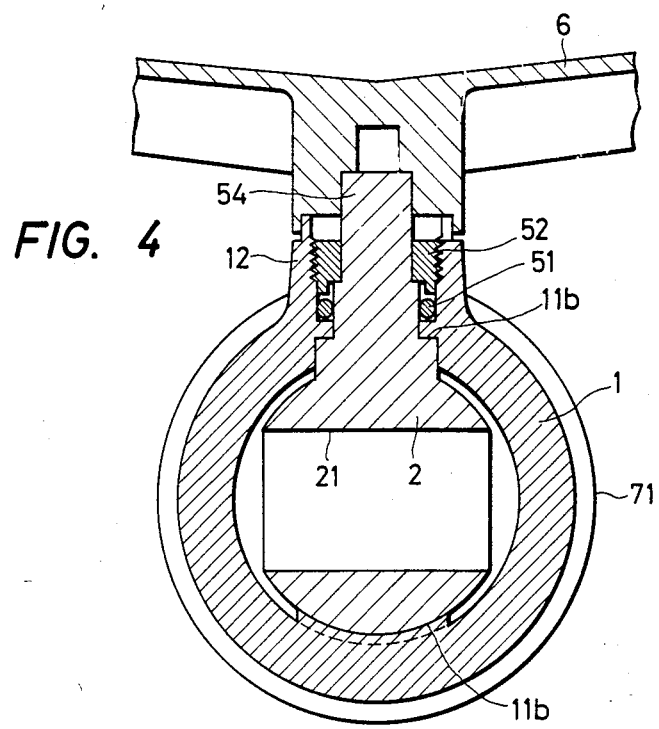
Figure 5:
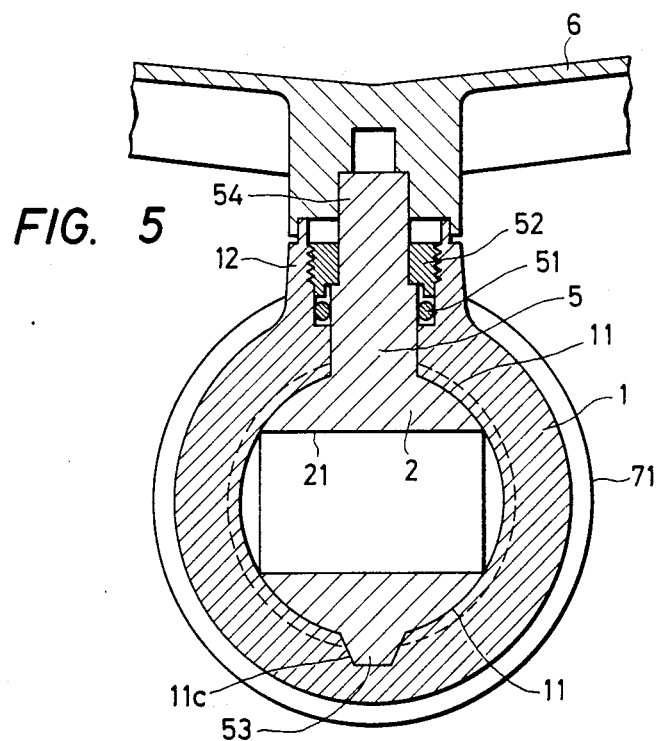

FIGS. 3 through 5 show modifications of the ball and seat in the valve body of the ball valve according to the invention. In these modifications, those components which have been previously described with reference to FIG. 1 are designated by the same reference numerals.

In the modification in FIG. 3, the seats 11a are formed so that they contact only the parts of the ball surface which are located around the axis of the spindle. In other words, the ball 2 is pivotally supported by the seat 11a at two positions where the spindle 5 crosses the valve body. It is desirable for the seats 11a to be as large as possible under the condition that they do not obstruct the provision of the annular seals 33 and 43.

In the case of FIG. 4, only the part of the ball surface which is located around the spindle axis and on one side of the ball which is opposite to the side where the spindle 5 is provided is in surface contact with a seat 11b, and the step of the spindle 5 is engaged with the step of the valve body 1 to rotatably support the ball 2. In this connection, the step of the spindle 5 may be locked to the valve body 1 with a locking ring which is threadably engageable with the valve body, similar to the case of the bushing 52 in FIG. 1. The ball is pivotally supported only around the spindle axis, as described above. Therefore, the frictional resistance for turning the ball is smaller, as a result of which the ball can be smoothly turned to open or close the valve. In addition, in molding the valve body 1 with the ball 2 inserted, the molten resin does not contact the surfaces of the ball 2 which slide on the annular seals 33 and 43. Accordingly, the surface of the ball 2 is maintained smooth.

The ball valve of the invention may be modified so that, as shown in FIG. 5, a protrusion 53 extends from the part of the ball surface which is located around the spindle axis and on one side of the ball which is opposite the side where the spindle 5 is provided. The protrusion 53 is in surface contact with a seat 11c formed in the valve body 1. It is preferable that the protrusion 53 be in the form of a circular cone or a frustrum of circular cone. The protrusion 53 may be pivotally supported by only the surface of the seat 11c. Furthermore, the ball valve may be modified so that, instead of the protrusion 53, a recess is formed in the surface of the ball 2 and a protrusion extends from the seat engaging the recess. In a valve in which the protrusion extends from the surface of the ball 2 or the recess is formed in the surface of the ball, the ball 2 is pivotally supported by the valve body 1 with a high concentricity.

A variety of modifications of the seat 11 are possible as described above. However, in the ball valve of the invention, at least a part of the ball surface located around the spindle axis and on the side of the ball 2 opposite the side where the spindle 5 is provided should be in surface contact with the seat.

In the described invention, the valve body 1 is injection molded with the ball 2 inserted in the mold cavity. In this connection, the gate of the mold is generally positioned where the seat is formed, especially at the position where symmetrical flows of molten resin are obtained. Therefore, the temperature of the surface of the ball 2 near the gate is raised when the molten resin contacts the ball 2. Accordingly, in the case where the ball 2 is made of synthetic resin, the surface of the ball 2 may be deformed. However, this difficulty can be eliminated by providing a heat-resistant layer of metal or fluororesin such as tetrafluoroethylene resin on the surface of the ball 2 confronting the gate.

In accordance with the invention, the ball 2 may be made of metal or synthetic resin; however, synthetic resin is preferable from the viewpoint of chemical resistance. Furthermore, since the ball should have a high heat resistance, it is desirable that it be made of polyvinyl chloride resin, preferably chlorinated polyvinyl chloride resin, and more preferably, polyvinyl chloride resin compounded with graphite or chlorinated polyvinyl chloride resin compounded with graphite. Chlorinated polyvinyl chloride resin of 100 parts by weight containing chlorine of 63 to 71 percent by weight and graphite of 2 to 20 parts by weight is most preferable because of its high heat resistance. This material can be molded although its chlorine content is high. The valve body 1 is formed of a moldable material such as polyvinyl chloride resin or the like.

Figure 6:
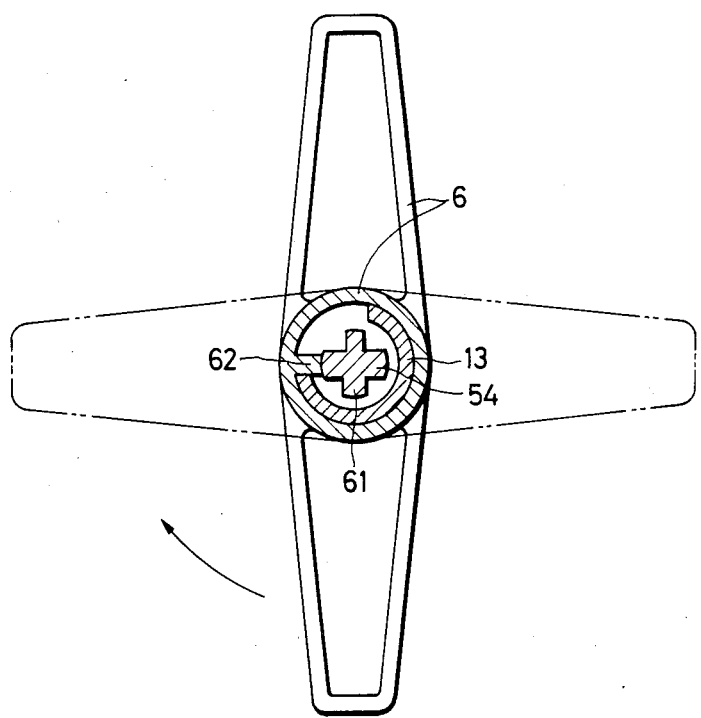
FIG. 6 is a cross-sectional view taken along a line VI—VI in FIG. 1.
Figure 7:
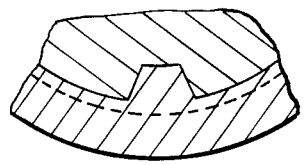
FIG. 7 is a cross-sectional view similar to that of FIGS. 2, 3, 4 and 5, showing a further modification of the ball and valve body of the invention.

In the invention, the handle 6 and the valve body 1 form a locking mechanism so that the ball 2 is allowed to turn through 90° in one direction to fully open the valve from the closed position shown in FIG. 6.

The locking mechanism of the handle 6 will be described with reference to FIG. 6. The upper end portion of the spindle 5 is formed into a cross-shaped fitting protrusion 54 which is fitted into a cross-shaped recess 61 formed in the handle 6. Therefore, the spindle 5 can be turned with the handle 6. An annular projection 13 with a cut extends from the upper surface of the annular bearing part 12 of the valve body 1, while a stop 62 is formed in the handle 6 engaging with the cut of the projection. Therefore, the handle 6 can be turned through an angle which is defined by both ends of the cut between which the stop 62 is moved.

If the positions where the stop 62 strikes the two ends of the cut of the projection 13 are determined so that the valve is opened when the handle 6 is set in the direction of the fluid passage and the valve is closed when the handle is set in a direction perpendicular to the direction of the fluid passage, then it can be detected from the direction of the handle 6 whether the valve is opened or closed.

With the ball valve of the invention designed as described above, the part of the ball surface around the spindle axis and on the side of the ball opposite the side where the spindle is provided is in surface contact with the seat of the valve body to pivotally support the ball; that is, the ball is held in surface contact with the seat. Therefore, even under the condition that the valve is closed and liquid pressure is applied to the ball from one side, when the union nut on the other side is loosened, the ball will not blow out.

The ball abuts against the annular seals on both sides in the fluid passage, and the annular seals are pushed towards the ball by the seal carriers. Therefore, if fluid leakage occurs, such can be eliminated by further tightening the union nuts to push the seal carriers towards the ball. Furthermore, if the annular seal is damaged, it is possible to replace only the annular seal. Thus, the ball valve of the invention is economical.

We claim:
1. A union-type ball valve comprising:
    a valve body (1) having a fluid passage therethrough;
    at least one connecting sleeve (7) having a flange portion at an end thereof and at least one union nut for releasably joining said connecting sleeve to said valve body;
    a ball (2) with a spindle (5), said ball and spindle being arranged in said valve body to enable said fluid passage through said valve body to be selectively opened or closed;
    a valve seat (11) formed integrally with the inner wall of said valve body, said valve seat having at least two concave valve seat portions (11a) contacting opposite portions of the outer periphery of said ball, said opposite portions of said outer periphery being positioned such that the rotational axis of said spindle passes through each of said outer periphery portions, said ball being retained by said two concave seat portions such that ball blow out is prevented when said fluid passage is closed in the presence of fluid pressure on one side of said ball and the connecting sleeve is disconnected from said valve body on the opposite side of said ball;
    at least one seal carrier (31, 41) and a respective seal (33, 43) positioned between said connecting sleeve and said ball, said seal carrier abutting the flanged end of said connecting sleeve, said seal abutting a portion of the outer periphery of said ball not in contact with said seat and said seal carrier, such that as said union nut moves said connecting sleeve toward said valve body the sealing engagement between the seal and ball is increased.

2. The union-type ball valve of claim 1 wherein said two concave valve seat portions each extend 180° around the inner wall of said valve body to form an annular concave seat.

3. The ball valve as claimed in claim 1, in which a part of the surface of said ball around said axis of said spindle and on said side of said ball opposite said side where said spindle is provided has a protrusion.

4. The ball valve as claimed in claim 1, in which a part of the surface of said ball around said axis of said spindle and on said side of said ball opposite said side where said spindle is provided is formed with a recess.

5. The ball valve as claimed in claim 2, further comprising elastic packings provided between said annular seat and said seal carrier positioned such that said packings are compressed.

* * * * *